(12) United States Patent
Jagoe et al.

(10) Patent No.: US 9,391,932 B2
(45) Date of Patent: *Jul. 12, 2016

(54) INCLUDING A PLURALITY OF USERS IN A CONVERSATION OVER A COMMUNICATION NETWORK

(71) Applicant: Skype, Dublin (IE)

(72) Inventors: Andrew Jagoe, San Francisco, CA (US); Enlai Chu, San Mateo, CA (US)

(73) Assignee: Skype, Dublin (IE)

( * ) Notice: Subject to any disclaimer, the term of this patent is extended or adjusted under 35 U.S.C. 154(b) by 331 days.

This patent is subject to a terminal disclaimer.

(21) Appl. No.: 14/064,999

(22) Filed: Oct. 28, 2013

(65) Prior Publication Data

US 2014/0059147 A1 Feb. 27, 2014

Related U.S. Application Data

(63) Continuation of application No. 13/004,464, filed on Jan. 11, 2011, now Pat. No. 8,571,592, which is a continuation of application No. 11/704,158, filed on Feb. 7, 2007, now Pat. No. 7,894,842.

(60) Provisional application No. 60/771,309, filed on Feb. 7, 2006.

(51) Int. Cl.
*H04B 7/00* (2006.01)
*H04L 12/58* (2006.01)
(Continued)

(52) U.S. Cl.
CPC ............ *H04L 51/04* (2013.01); *H04L 12/1818* (2013.01); *H04L 65/1069* (2013.01);
(Continued)

(58) Field of Classification Search
CPC . H04L 12/2803; H04L 12/2818; H04L 63/04; H04L 67/06; H04L 51/04; H04L 12/1818; H04L 12/24; H04L 29/06; H04W 8/205; H04W 76/022; H04M 2203/5063; H04M 2203/652; H04M 3/56; H04M 7/00; H04N 21/23424; H04N 21/235; H04N 21/25891; H04N 21/2668; H04N 21/435; H04N 21/812; H04N 21/44016; H04N 21/4667; H04N 21/6543; H04N 21/6582; H04N 21/4383
USPC ........... 455/519, 466, 518, 415, 412.2, 412.1; 370/352, 216, 401, 338, 389, 238
See application file for complete search history.

(56) References Cited

U.S. PATENT DOCUMENTS 5,682,325 A 10/1997 Lightfoot et al.
6,564,056 B1 5/2003 Fitzgerald
(Continued)

FOREIGN PATENT DOCUMENTS

EP 1761017 3/2007
GB 2320641 6/1998

OTHER PUBLICATIONS

"Advisory Action", U.S. Appl. No. 12/894,809, (Nov. 29, 2011), 3 pages.

(Continued)

*Primary Examiner* — Mahendra Patel
(74) *Attorney, Agent, or Firm* — Tom Wong; Micky Minhas

(57) ABSTRACT

Methods and devices are disclosed for including a plurality of users in a conversation over a communication network. A conversation is initiated when a text message is received requesting the conversation. A conversation is established using conversation gateways currently unused by users to be included in the conversation. Communication may occur across gateways in order to conserve conversation gateway resources.

17 Claims, 10 Drawing Sheets

(51) Int. Cl.
*H04L 12/18* (2006.01)
*H04M 3/56* (2006.01)
*H04L 29/06* (2006.01)
*H04L 29/08* (2006.01)

(52) U.S. Cl.
CPC ............ *H04L65/403* (2013.01); *H04L 67/306* (2013.01); *H04M 3/56* (2013.01); *H04M 2203/5063* (2013.01); *H04M 2203/652* (2013.01)

(56) References Cited

U.S. PATENT DOCUMENTS

| | | | |
|---|---|---|---|
| 6,763,226 | B1 | 7/2004 | McZeal, Jr. |
| 6,856,809 | B2 | 2/2005 | Fostick |
| 6,886,043 | B1 * | 4/2005 | Mauger ............... H04L 45/50 370/392 |
| 6,914,964 | B1 | 7/2005 | Levine |
| 7,003,327 | B1 | 2/2006 | Payne et al. |
| 7,295,836 | B2 | 11/2007 | Yach et al. |
| 7,319,882 | B2 | 1/2008 | Mendiola et al. |
| 7,505,571 | B2 | 3/2009 | Bhatia et al. |
| 7,653,192 | B1 | 1/2010 | Sylvain |
| 7,894,805 | B2 | 2/2011 | Joglekar |
| 7,894,842 | B2 | 2/2011 | Jagoe et al. |
| 8,139,585 | B1 | 3/2012 | Mangal |
| 8,325,740 | B2 * | 12/2012 | Kok ..................... H04M 3/12 370/218 |
| 8,571,587 | B2 | 10/2013 | Jagoe et al. |
| 8,571,592 | B2 | 10/2013 | Jagoe et al. |
| 2002/0173319 | A1 | 11/2002 | Fostick |
| 2003/0088698 | A1 | 5/2003 | Singh et al. |
| 2003/0097447 | A1 | 5/2003 | Johnston |
| 2004/0015547 | A1 | 1/2004 | Griffin et al. |
| 2004/0137887 | A1 | 7/2004 | Niemi |
| 2004/0151155 | A1 | 8/2004 | Jouppi |
| 2004/0218744 | A1 | 11/2004 | Nguyen et al. |
| 2004/0234059 | A1 | 11/2004 | Lazarus et al. |
| 2004/0258239 | A1 * | 12/2004 | Gallant ............... H04L 29/06 370/401 |
| 2005/0030977 | A1 * | 2/2005 | Casey .................. G08B 27/00 370/485 |
| 2005/0039205 | A1 | 2/2005 | Riedl |
| 2005/0079854 | A1 | 4/2005 | Auth et al. |
| 2005/0185658 | A1 | 8/2005 | Kamiwada et al. |
| 2006/0245568 | A1 * | 11/2006 | Son ..................... H04M 7/125 379/211.01 |
| 2007/0203982 | A1 | 8/2007 | Jagoe et al. |
| 2011/0021220 | A1 | 1/2011 | Jagoe et al. |
| 2011/0106902 | A1 | 5/2011 | Jagoe |

OTHER PUBLICATIONS

"Final Office Action", U.S. Appl. No. 12/894,809, (Sep. 21, 2011), 11 pages.

"Final Office Action", U.S. Appl. No. 12/894,809, (Sep. 28, 2012), 14 pages.

"Final Office Action", U.S. Appl. No. 13/004,464, (Jan. 29, 2013), 30 pages.

"Final Office Action", U.S. Appl. No. 13/004,464, (Jun. 29, 2012), 16 pages.

"International Search Report and Written Opinion", PCT Application PCT/US07/03398, (Nov. 21, 2008), 13 pages.

"Non-Final Office Action", U.S. Appl. No. 11/704,158, (Mar. 22, 2010), 30 pages.

"Non-Final Office Action", U.S. Appl. No. 12/894,809, (Apr. 13, 2011), 9 pages.

"Non-Final Office Action", U.S. Appl. No. 12/894,809, (Jan. 19, 2012), 10 pages.

"Non-Final Office Action", U.S. Appl. No. 13/004,464, (Aug. 31, 2011), 15 pages.

"Non-Final Office Action", U.S. Appl. No. 13/004,464, (Aug. 20, 2012), 24 pages.

"Notice of Allowance", U.S. Appl. No. 11/704,158, (Dec. 23, 2010), 8 pages.

"Notice of Allowance", U.S. Appl. No. 12/894,809, (Jun. 24, 2013), 8 pages.

"Notice of Allowance", U.S. Appl. No. 13/004,464, (Jun. 25, 2013), 18 pages.

"Restriction Requirement", U.S. Appl. No. 11/704,158, (Sep. 13, 2010), 7 pages.

* cited by examiner

INCLUDING A PLURALITY OF USERS IN A CONVERSATION OVER A COMMUNICATION NETWORK

RELATED APPLICATIONS

This application is a continuation of U.S. application Ser. No. 13/004,464, filed Jan. 11, 2011 which is a continuation of U.S. application Ser. No. 11/704,158, filed Feb. 7, 2007, which claims the benefit of U.S. Provisional Application Ser. No. 60/771,309, filed Feb. 7, 2006, the entire contents of which are hereby incorporated herein by reference in their entirety.

BACKGROUND

The present invention relates generally to network communication and, more particularly, to group interactions on a communication network.

Telephone and computer technology provide a wide array of services for users of telephone networks and computer networks. Indeed, computers routinely provide a capability of transmitting voice over telephone networks, and once-relatively-simple cellular telephones may function as sophisticated network computing devices in their own right. Users are comfortable intercommunicating in chat rooms normally provided by computer network services, and text messaging, once associated more with email and computers than with other communication media, now accounts for a significant percentage of traffic on cellular telephone networks.

Telephone conferencing is common in business environments as a low-cost alternative to face-to-face conversations that may require relatively costly travel with its attendant inconvenience and delay. A user or business wishing to set up a telephone conference may arrange with a communication provider, such as a telephone company, to establish a conference at a specified time. Users then may be notified, e.g., by letter, telephone, email or the like, of the conference and may be given a special phone number (either toll-free or not) to call at the time of the conference. The users further may be given an additional code number to be entered before being allowed to enter the conference.

Chat rooms, normally associated with computer networks, typically are established by commercial enterprises such as newspapers, sports associations, professional groups and the like to provide group members and customers an opportunity to share views by exchanging text messages. As such, typical chat rooms have a generally public character, and their structure is fixed and static once a chat room is established. Chat room users may be required to register or in some other manner become accepted in order to participate in chat room activity.

Text messaging, which may employ services such as Short Message Service (SMS), provides simple, convenient, silent messaging between cellular telephones. Multimedia Message Service (MMS) extends capabilities of SMS to include transmission of graphic information. Generally, SMS and MMS are oriented to point-to-point communication.

SUMMARY

In one or more embodiments, private multiparty text messaging that is dynamically controlled and allocated while multiparty conversations are in progress is enabled. One particular embodiment may provide a method of including a plurality of users in a conversation over a communication network. One implementation of the method may comprise receiving a request to create a conversation, creating a conversation identifier according to the request, and further may comprise receiving a plurality of lists of conversation gateways currently unused by the plurality of users. A plurality of conversation gateways to be used by the plurality of users for the conversation may be selected, the plurality of selected conversation gateways being selected according to the plurality of lists of currently unused conversation gateways. The plurality of selected conversation gateways may be associated with the conversation identifier.

In one or more embodiments, a conversation communication system for including a plurality of users in a conversation over a communication network is described. One embodiment of the system may comprise a communication interface adapted to communicate with the plurality of users over the communication network and a conversation manager adapted to communicate with the communication interface and to receive from the communication interface a plurality of lists of conversation gateways currently unused by the plurality of users. The system further may comprise a conversation gateway selector adapted to select a plurality of conversation gateways according to the plurality of lists of unused conversation gateways and still further may include a mapper adapted to associate the plurality of selected conversation gateways with the conversation identifier.

Another embodiment may comprise a computer adapted to include a plurality of users in a conversation over a communication network. The computer may comprise a processor adapted to execute software programs, a memory communicative with the processor, the memory adapted to store software programs and data according to the conversation. The computer further may comprise a communication interface adapted to communicate with the processor and with the plurality of users over the communication network. A conversation manager software program adapted to cause the processor to create and store in memory a conversation identifier according to the conversation may be included. The conversation manager software program, further, may cause the processor to receive from the communication interface a plurality of lists of conversation gateways currently unused by the plurality of users. The computer still further may comprise a conversation gateway selector software program adapted to cause the processor to select a plurality of conversation gateways according to the plurality of lists of unused conversation gateways and still further may comprise a mapper software program adapted to cause the processor to associate the selected plurality of conversation gateways with the conversation identifier.

While the apparatus and method has or will be described for the sake of grammatical fluidity with functional explanations, it is to be expressly understood that the claims, unless expressly formulated under 35 U.S.C. 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. 112 are to be accorded full statutory equivalents under 35 U.S.C. 112.

Any feature or combination of features described herein are included within the scope of the present invention provided that the features included in any such combination are not mutually inconsistent as will be apparent from the context, this specification, and the knowledge of one skilled in the art. For purposes of summarizing the present invention, certain aspects, advantages and novel features of the present invention are described herein. Of course, it is to be understood that not necessarily all such aspects, advantages or features will be embodied in any particular embodiment of the present invention. Additional advantages and aspects of the present invention are apparent in the following detailed description and claims that follow.

DETAILED DESCRIPTION

Figure 1:
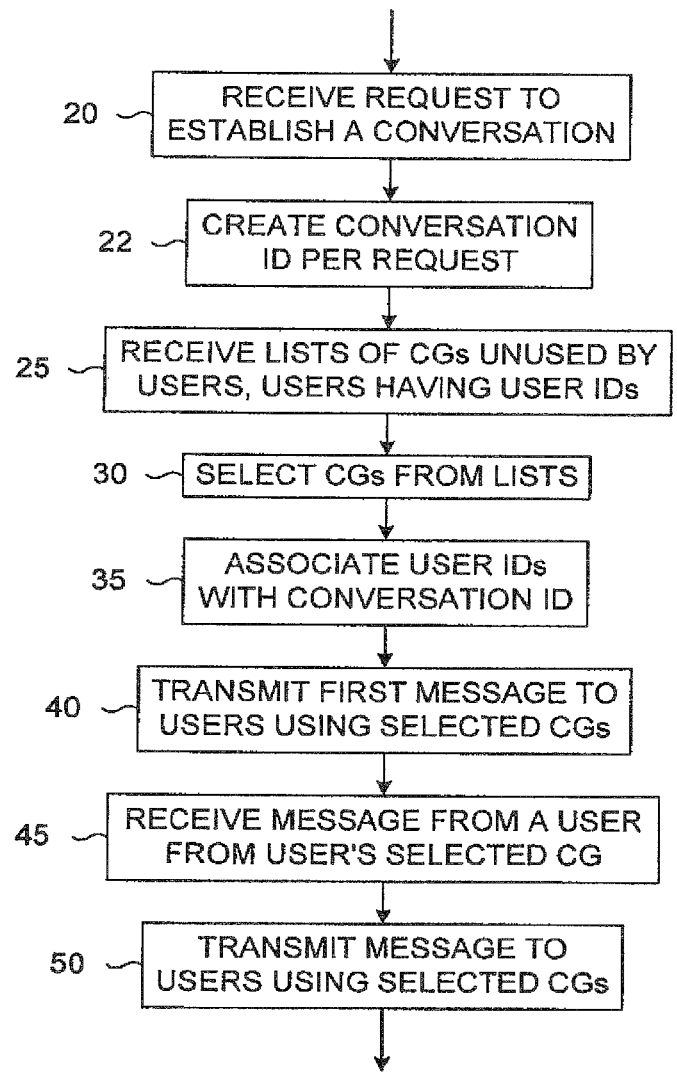
FIG. 1 is a flowchart of one particular implementation of a method of establishing a conversation over a communication network.

Reference will now be made in detail to various embodiments, examples of which are illustrated in the accompanying drawings. Wherever possible, the same or similar reference numbers are used in the drawings and the description to refer to the same or like parts. It should be noted that the drawings are in simplified form and are not to precise scale. In reference to the disclosure herein, for purposes of convenience and clarity only, directional terms, such as, top, bottom, left, right, up, down, over, above, below, beneath, rear, and front, are used with respect to the accompanying drawings. Such directional terms should not be construed to limit the scope of the invention in any manner.

Although the disclosure herein refers to certain illustrated embodiments, it is to be understood that these embodiments are presented by way of example and not by way of limitation. The intent of the following detailed description, although discussing exemplary embodiments, is to be construed to cover all modifications, alternatives, and equivalents of the embodiments as may fall within the spirit and scope of the various embodiments as defined by the appended claims. It is to be understood and appreciated that the methods and devices described herein do not constitute a complete description of a process for establishing and managing text-based telephone conversations. The present invention may be practiced in conjunction with various types of communication devices, networks, and services that are conventionally used in the art, and only so much of the commonly practiced process steps are included herein as are necessary to provide an understanding of the present invention. The present invention has applicability in the field of communication networks in general. For illustrative purposes, however, the following description pertains to methods and devices for facilitating intercommunication over mobile telephone networks.

Referring more particularly to the drawings, FIG. 1 is a flowchart of one particular implementation of a method of establishing a conversation over a communication network. A conversation may be described as a collection of messages comprising group text message communication involving a plurality of participants (e.g., users). Users may have identification that distinguishes users in a conversation from other users in the same conversation. This identification may comprise a first name, a last name, a nickname, a phone number, email address, or the like. Messages sent by any user in the conversation may be sent to all other users in the conversation. Further, each user in the conversation may be able to see who else is involved in the conversation. The conversation may involve sending and/or receiving text messages using, for example, facilities of a Short Message Service (SMS) or Multimedia Message Service (MMS).

The particular implementation illustrated in FIG. 1 may provide a medium of communication involving groups, the medium being created dynamically as needed. According to the illustrated implementation, a request to establish a conversation is received at step 20. A conversation identifier (conversation ID) is created at step 22 according to the request. The conversation ID may provide a way to distinguish among multiple conversations that may be simultaneously active on the communication network. According to an exemplary embodiment, client software is installed on a user's cell phone. When a user initiates a conversation, for example, by keying a text message into a keypad on the cell phone, the client may encode into a payload, which may be, for example, a binary payload, an initial message from the user. Additionally, names and numbers, e.g., phone numbers of the plurality of users, (i.e., prospective conversation participants) may be selected from an address book on the user's cell phone, the names and numbers also being encoded into the payload. In some embodiments, the initial message may not be encoded. In other embodiments, the phone numbers may or may not be encoded. In still other embodiments, the initial message may comprise a null message or may be omitted without departing from the spirit of this disclosure. The payload may be received as a short message service (SMS) message. Alternatively, the payload may be received via a network using, for example, an internet protocol (IP) or hypertext transfer protocol (HTTP), or via a device that supports a wireless application protocol (WAP), mobile internet pages, or even via a third-party web service or the like. The received payload may be interpreted as a request to establish a conversation.

Figure 2:
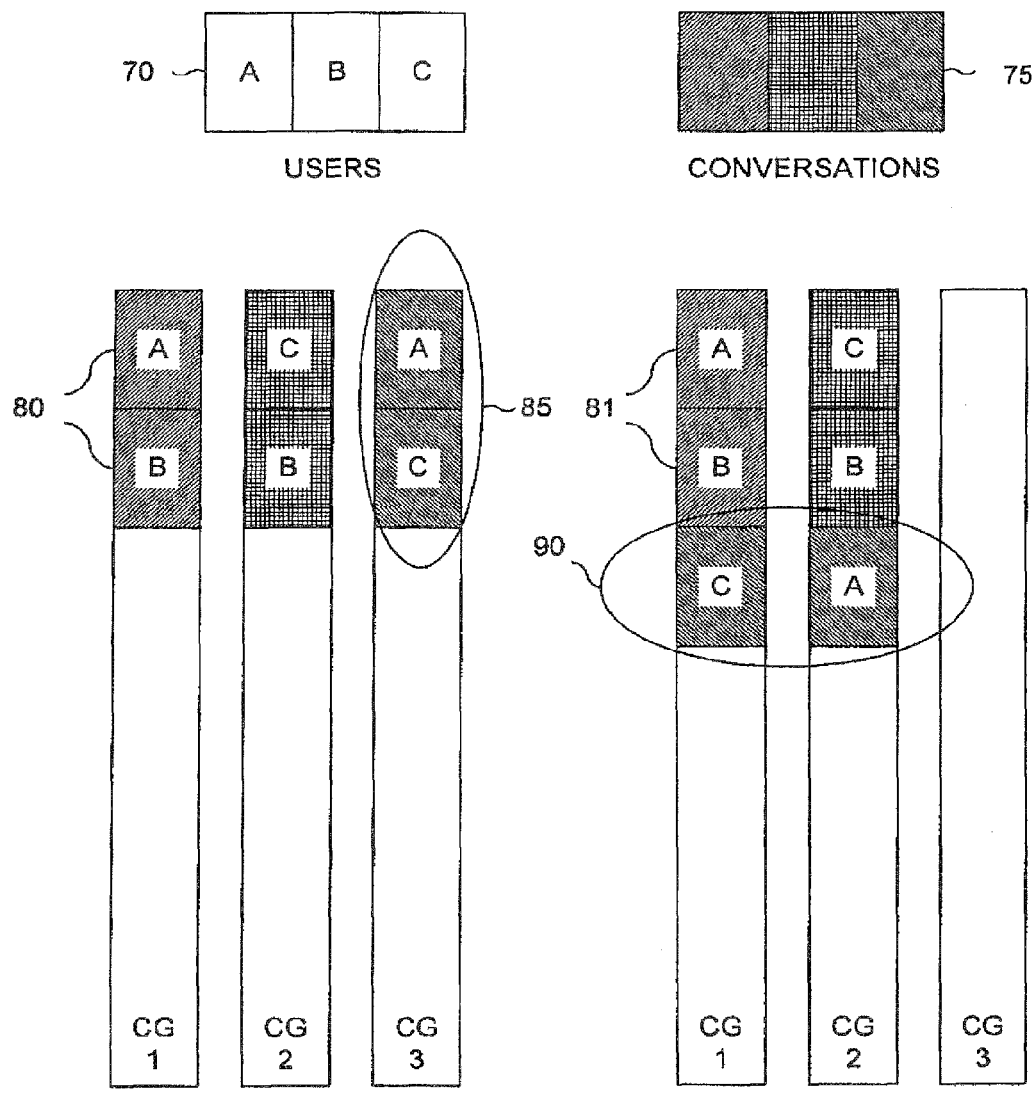
FIG. 2 is a conceptual diagram illustrating how conversation gateways may support multiple conversations.

At step 25 a list of conversation gateways (CGs) is received for each of the plurality of users to be involved in the conversation. A CG may be described as a virtual channel or communication medium characterized by a unique identifier (e.g., shortcode, telephone number, and the like) to which a user can send messages and from which a user may receive messages. For example, a CG may be a point at which a service for providing conversations appears to a cellular telephone network. Prior art group chat services require all users in a conversation to use the same CG. That is, one CG must be allocated for each active conversation supported by the service. The present disclosure enables users to use different CGs and still participate in the same conversation. FIG. 2 illustrates the concept. Three users 70 are identified in FIG. 2, the users being identified as A, B, and C. Three conversations 75 are identified as well distinguished in the figure by three different types of cross-hatching FIG. 2A illustrates a prior art assignment of users to CGs where, for example, users A, B, and C are involved in three different 2-user conversations. For example, users A and B are occupied in a first conversation 80 using conversation gateway 1 (CG 1). Similarly, users B and C are occupied in a second conversation using CG 2, and users A and C are involved in a third conversation 85 using CG 3. Generally, a single user cannot be involved in more than one conversation on a single gateway. Because conversations must take place within gateways, it should be clear that, for example, three CGs are required in order to support conversations involving three users.

FIG. 2B illustrates an assignment of users to CGs according to the implementation of the method illustrated in FIG. 1. It will be noted that, as in FIG. 2A, users A and B communicate in a conversation 81 using CG 1, and users B and C again converse using CG 2. However, users A and C communicate in a conversation 90 across CGs, user A employing CG 1 and user C employing CG 2. Consequently, although a single user still cannot be involved in more than one conversation on a single gateway, the implementation of FIG. 1 does allow for cross-CG conversations. As a consequence, in the present example, CG 3 as a resource is made available for other uses. Further, providing CGs may be expensive. One facility using CGs pays a relatively large monthly fee for the use of each CG. Consequently, there is a great incentive for reducing a number of CGs required to provide service to a given user population.

Returning to FIG. 1, an unused CG is selected for each user to be included in the conversation at step 30, and each user may be associated with the conversation ID at step 35. More precisely, the selected CG of each user may be associated with the conversation ID. Once all users to be involved in the conversation are so associated, a first message may be transmitted at step 40 to all users in the conversation using the CG assigned to each user at step 40. The transmitted message may be a welcome message saying, for example, "Welcome to XYZ chat involving Allen, Buddy, Connie, and Doris. You may send a message at any time." Each user then can send a message to every other user in the conversation by sending a message to a conversation gateway assigned to him/her for this conversation. A system implementing the method (e.g., a service) can determine which conversation the user is trying to send a message to and can forward the message to all other members in the conversation by way of the respective conversation gateways assigned to each user for the conversation. It should be noted that new users may be added at any time, even after the conversation has started, by selecting an unused CG for each user and by associating the user's CG with the conversation ID.

If, at step 25, a certain user, say user X, has no unused CGs, then user X may be notified that a first user wants to include user X in a conversation. According to one embodiment, a control CG may be reserved for situations where a service may need to contact a user for administrative reasons. In the present example, User X may be requested to discontinue at least one active conversation in which user X may be involved. When user X leaves another active conversation, then user X may be added to the conversation involving the first user. Alternatively, user X may be dropped from another active conversation, or another active conversation may be ended or timed out.

Thereafter, a message may be received from a CG associated with the conversation at step 45, and the message may be transmitted, i.e., forwarded to the CGs of all other users in the conversation at step 50 by sending the message to a remainder of the CGs involved in the conversation.

Figure 3:
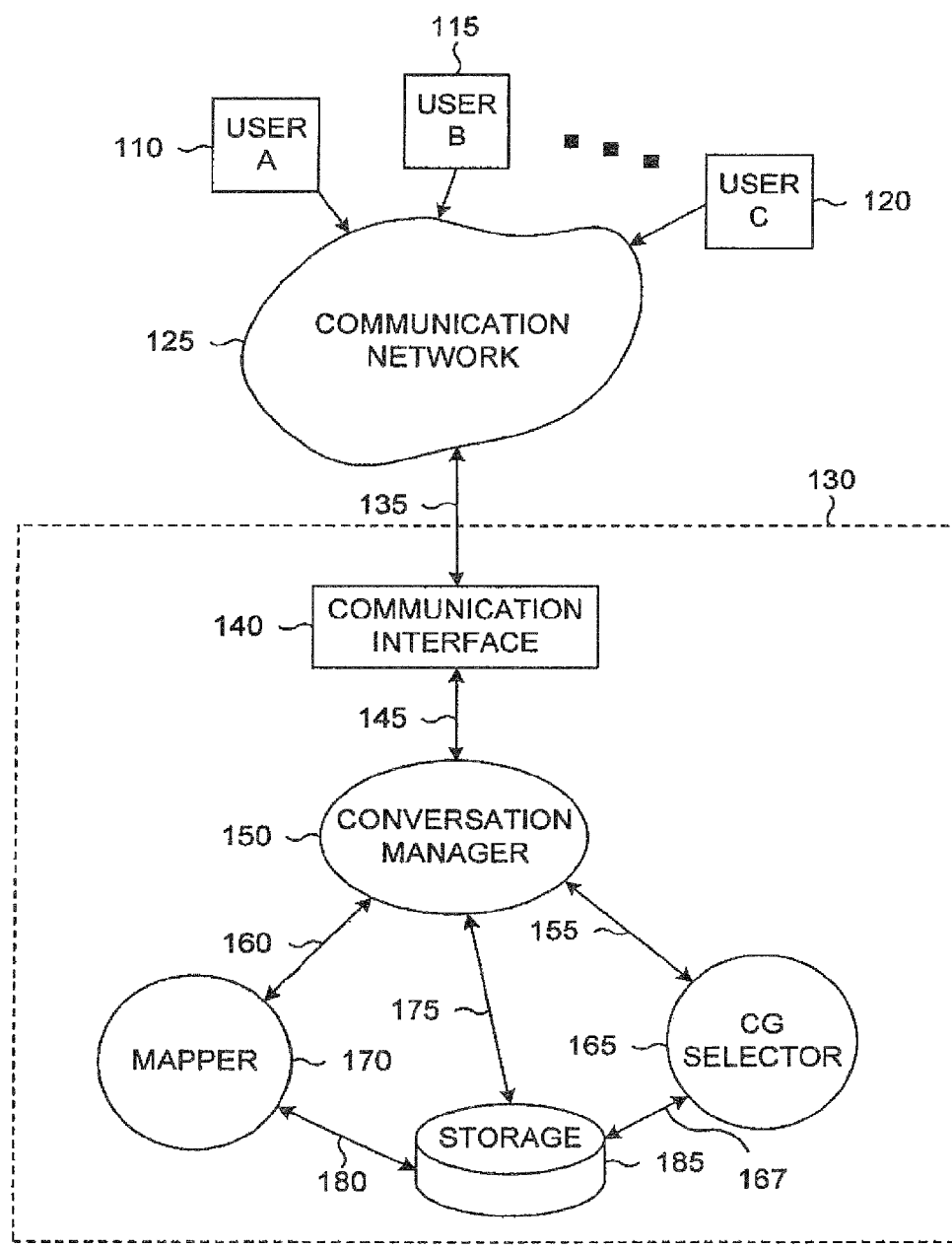
FIG. 3 is a block diagram of one particular embodiment of a collection of components and modules adapted to include a plurality of users in a conversation over a communication network.

FIG. 3 is a block diagram of one particular embodiment of a collection of components and modules adapted to include a plurality of users in a conversation over a communication network according to a method, an example of which is described supra with reference to FIG. 1. The embodiment illustrated in FIG. 3 may be described as a system 130 that facilitates intercommunication among a collection of users 110, 115, and 120 over a communication network 125. For example, the users may employ cellular telephones, and the communication network 125 may comprise a cellular telephone network. The cellular telephone network may connect to an internet that also may be considered in this discussion to be included in the communication network 125. The system 130 may comprise a communication interface 140 that is configured to communicate with the communication network 125 in a conventional manner over a communication path 135 connecting the communication interface 140 to the communication network 125. The communication interface 140 is thereby adapted to communicate with the plurality of users 110, 115, and 120. The system 130, further, may comprise a conversation manager module 150 that intercommunicates with the communication interface 140 over a communication path 145 connecting the conversation manager module 150 with the communication interface 140.

The conversation manager module 150 may receive from the communication interface 140 a request originating with a user in a form of, for example, a text message, to form a conversation involving a plurality of users. The conversation manager module 150 then may create a conversation identifier (ID) according to step 20 (FIG. 1). The conversation manager module 150, further, may receive a plurality of lists of conversation gateways (CGs) currently unused by the plurality of users (e.g. users 110, 115, and 120 in the present example). According to one particular implementation, the plurality of lists of CGs is retrieved from a storage unit 185 (described more fully infra) by the conversation manager 150 over, for example, communication path 175. The system 130, further, may comprise a CG selector module 165, the CG selector module 165 being adapted to select a plurality of CGs according to the plurality of lists of unused CGs. For example, the conversation manager module 150 may pass the plurality of lists to the CG selector module 165 over a communication path 155 between the conversation manager module 150 and CG selector 165 modules. The CG selector module 165 may select from the plurality of lists, one CG for each user and may return a list of selected CGs to the conversation manager module 150 over the communication path 155. According to another embodiment, the CG selector module 165 maintains a database of available gateways, for example, on the storage unit 185 by communicating with the storage unit 185 over a communication path 167. The conversation manager module 150, in that instance, receives a list of currently-available gateways by interacting with the database on the storage unit 185 over communication path 175.

The system 130, as illustrated, still further may comprise a mapper module 170 adapted to associate the plurality of selected conversation gateways with the conversation identifier. According to one exemplary implementation, the conversation manager module 150 passes the list to the mapper module 170 over another communication path 160 between the conversation manager module 150 and mapper 170 modules. The conversation manager module 150, further, may pass the conversation ID to the mapper module 170. The mapper module 170 may associate the selected CGs with the conversation identifier (ID) and may create a table (cf. discussion infra with reference to FIG. 4) summarizing the association and may pass the table to a storage unit 185 over communication path 180.

Figures 4, 5:
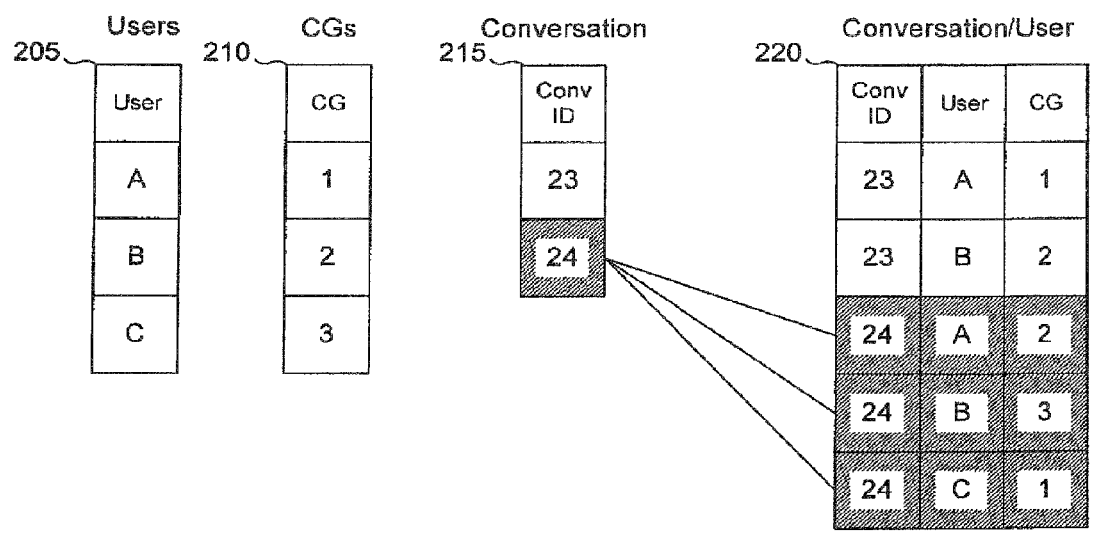
FIG. 4 is a collection of tables summarizing an association of a conversation identifier with a conversation.
FIG. 5 is a table illustrating a list of unused conversation gateways.

FIG. 4 is a collection of simplified tables that illustrates one particular way of organizing information related to a particular conversation. A first table 205 comprises a list of users: A, B and C in the illustrated example. A second table 210 lists CGs, identified as 1, 2 and 3 in the figure. A third table lists currently active conversations according to conversation IDs. The third table shows that two conversations, conversations 23 and 24 are of interest. Shading in the table is intended to illustrate that, for example, conversation 23 may be active before a request to establish a new conversation, conversation 24 is received. A fourth table 220 illustrates one possible assignment of users and CGs according to conversations. For example, the fourth table 220 indicates that users A and B converse in conversation 23 using, respectively, CGs 1 and 2.

Again, shaded blocks in third and fourth tables 215 and 220 are intended to represent entries associated with a new conversation request received at a time when conversation 23 is already active. That is, referring again to FIGS. 1 and 3 with continuing reference to FIG. 4, the conversation manager module 150 may receive a request to form a conversation involving users A, B, and C. The conversation manager module 150 may, accordingly, create a conversation ID per step 20 (FIG. 1), the created conversation ID being 24 in the present example. The conversation manager module 150 may, as described supra with reference to FIG. 3, receive a plurality of lists of CGs currently unused by users A, B, and C. For example, a list of a type illustrated in FIG. 5 in a table 225 may be received illustrating that CGs 2 and 3 are currently unused by user A, CGs 1 and 3 are currently unused by user B, and CGs 1, 2 and 3 are currently unused by user C. It will be noted that the information in table 225 (FIG. 5) is consistent with the information in the fourth table 220 (FIG. 4) that indicates that users A and B are currently involved in conversation 23 and are using, respectively, CG 1 and CG 2.

The conversation manager module 150 (FIG. 3) may pass the lists of unused CGs to the CG selector module 165 as already described, and the CG selector module 165, in this instance, may select CG 2 to be used by user A, CG 3 to be used by user B, and CG 1 to be used by user C, each of the selected CGs being unused by the respective users according to the information in the table of FIG. 5. The CG selector module 165 may return the selected CGs to the conversation manager module 150, and the conversation manager module 150 may pass the conversation ID and the selected CGs to the mapper module 170. The mapper module 170 may associate the selected CGs with the conversation ID according to step 40 (FIG. 1), thereby, effectively, filling out the shaded rows of the fourth table 220 (FIG. 4). The mapper module 170 may, accordingly, update the fourth table 220, which may reside in a storage unit 185, by passing, for example, shaded elements of the fourth table 220 over a communication path 180 that connects the mapper module 170 to the storage unit 185. The storage unit 185 may comprise, in typical embodiments, a hard disk, flash memory, or the like.

The conversation manager module 150 may access the fourth table 220 (FIG. 4) on the storage unit 185 over communication path 175 and, according to the selected CGs appearing in the fourth table 220, may transmit through the communication interface 140 a first message to users A, B, and C, effectively starting conversation 24, which may comprise a collection of messages, according to step 40 (FIG. 1).

Thereafter, conversation manager module 150 (FIG. 3) may receive a message from time to time from, for example, one of users A, B and C according to step 45 (FIG. 1) and may transmit the message to the others of users A, B, and C according to step 50 (FIG. 1).

According to an exceptional mode of operation, a certain user may have no unused conversation gateways when the conversation manager module 150 attempts to establish a new conversation that includes the certain user. In that case, the conversation manager module 150 may notify the certain user that another user wishes to include the certain user in a conversation. The certain user may be requested to discontinue at least one active conversation in order to accommodate the new request. Otherwise, when the certain user leaves another active conversation, either voluntarily, by being dropped from the other active conversation, or because the other active conversation ends or times out, then the conversation manager module 150 may include the certain user in the new conversation.

Figure 6:
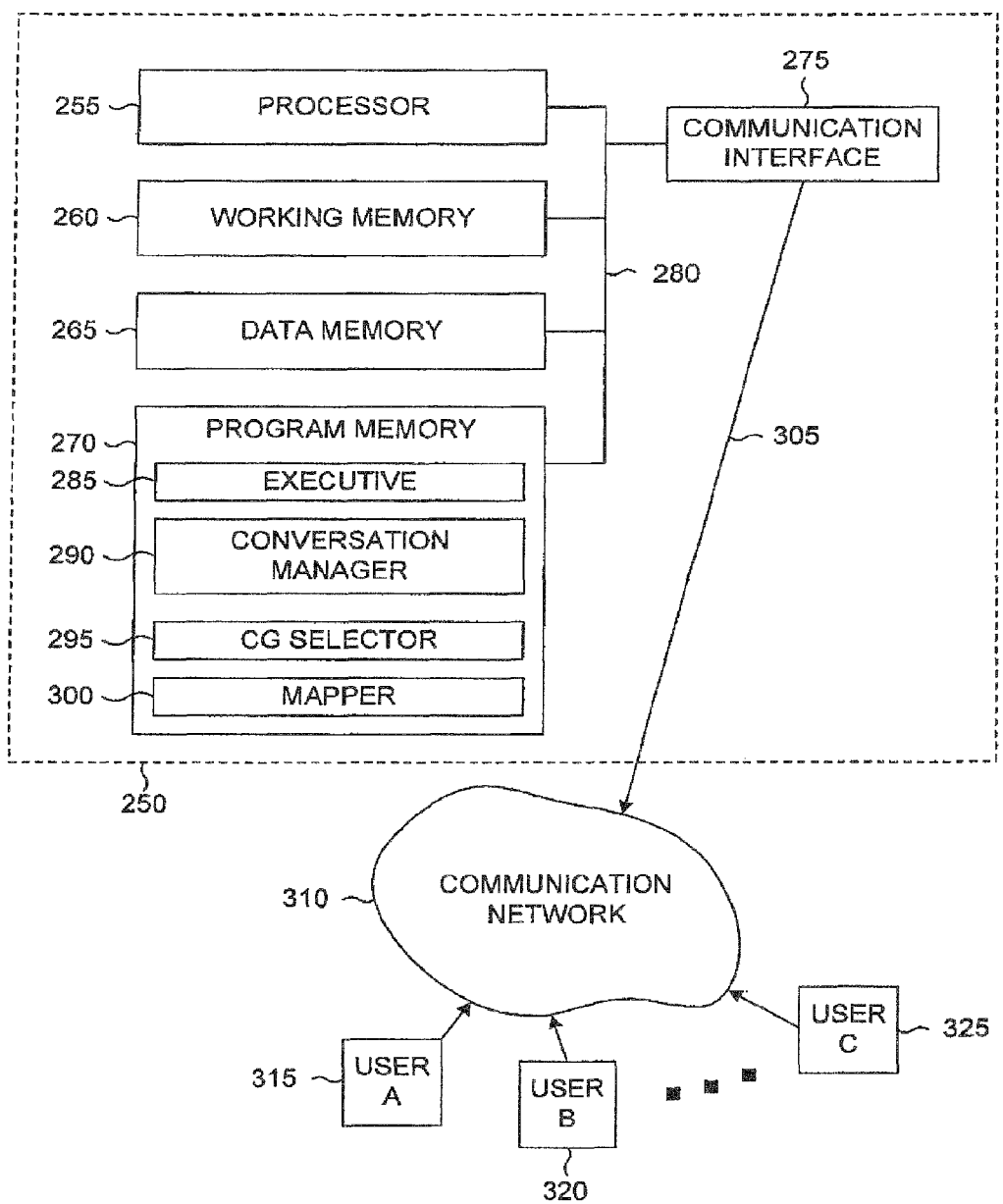
FIG. 6 is a block diagram of a computer adapted to include a plurality of users in a conversation over a communication network.

FIG. 6 is a block diagram of a computer 250 adapted to include a plurality of users in a conversation over a communication network 310. The computer 250 in the illustrated embodiment may comprise a processor 255 adapted to execute software program instructions, memory, which may comprise, for example, working memory 260, data memory 265 and program memory 270, and a communication interface 275, all of the aforementioned elements being interconnected by a system bus 280. The system bus 280 may, in particular, communicatively connect the processor 255 with the remaining elements already identified.

The program memory 270 may have stored therein software programs that, when executed by the processor 255, may cause the processor 255 to perform functions according to the software programs as herein described. In the illustrated example, software programs comprising a conversation manager 290, a conversation gateway (CG) selector 295, and a mapper 300 are stored in program memory 270 along with an executive 285 software program that may cause the processor 255 to facilitate and coordinate execution of at least the software programs illustrated.

The communication interface 275 may connect over a communication path 305 with a communication network 310 to which is connected a plurality of users, e.g. users 315, 320 and 325 in the present example. That is, the communication interface 275 may communicate with the plurality of users over the communication network 310.

In one typical mode of operation, the processor 255 operating according to the conversation manager 290 software program may receive from the communication interface 275 a request, e.g., a text message originating from a cellular telephone, from a user (e.g. one of users 315, 320, and 325) connected to the communication network 310, the request asking that a conversation among a plurality of users, for example, users A, B and C (i.e., users 315, 320 and 325) be established. The conversation manager 290 software program may cause the processor 255 to create a conversation identifier (ID) according to step 20 (FIG. 1) as already described and to store the conversation ID in memory, for example, working memory 260. The conversation manager 290 software program further may cause the processor 255 to receive, for example, from data memory 265, a plurality of lists of conversation gateways (CGs) currently unused by the plurality of users. If, for example, a particular user, say, user A, has no unused CGs when the processor 255 attempts to include user A in a conversation, then the conversation manager 290 software program may cause the processor 255 to notify the user of the desire of another user to include user A in a new conversation. User A may be added to the new conversation when user A leaves at least one other active conversation for any reason (e.g., by being dropped from the other active conversation, by leaving the other active conversation voluntarily, by having the other active conversation time out, or the like). According to one particular mode of operation, the executive 285 software program may cause the processor 255 to execute the CG selector 295 software program that may cause the processor 255 to select a plurality of CGs according to the plurality of lists of unused CGs and to store the plurality of selected CGs in, for example, working memory 260. The executive 285 software program then may cause the processor 255 to execute the mapper 300 software program, which may cause the processor 255 to associate the plurality of selected CGs located in working memory 260 with the conversation ID likewise previously stored in working memory 260. According to one embodiment, the mapper 300 software program may cause the processor 255 to create a table according to the association and to store the table in data memory 265. The table may take a form as described supra with reference to FIG. 4.

The conversation manager 290 software program may cause the processor 255 to access the association in data memory 265 and to transmit a first message through the communication interface 275 according to the selected CGs stored in data memory 265. The first message may be directed to users associated with the CGs, e.g. users A, B and C (i.e. users 315, 320 and 325) in the present example. Thereafter, the conversation, which may comprise a collection of messages, may continue as the processor 255, by operating according to instructions appearing in the conversation manager 290 software program, may receive at least one message from at least one user communicating on a selected CG. The conversation manager 290 software program may, in that case, cause the processor 255 to forward, i.e., transmit) the message to the plurality of users through the communication interface 275 over the plurality of selected CGs.

It should be emphasized that the embodiment illustrated in FIG. 6 may permit users to communicate across conversation gateways (CGs) as described supra with reference to FIG. 2. That is, the conversation manager 290 software program may cause the processor 255 to communicate over the communication interface 275 with a first user using a first CG and to communicate with a second user using a second CG, the second CG being different from the first CG. For example, in FIG. 2B, user C employing CG 1 communicates with user A, who employs CG 2, which cross-CG communication may not be permitted in prior art chat services.

Typical embodiments of the system 130 (FIG. 3) or computer 250 (FIG. 6) may provide a service that may perform various management functions associated with a conversation. Indeed, management of a conversation by such a service may involve various types of interactions. For discussion purposes herein, an "interaction" may be considered to be a one-to-one administrative conversation between a user and a computer or system providing the service. Such an interaction may be initiated by a user (e.g., signing up for services, initiating a chat, adding a friend to an address book, and the like). As another example, an interaction may be initiated by the service (e.g. asking a user to exit from a pending chat, reminding a user to sign up, and the like). Interactions may require the service to store, for example, states to preserve variables, parameters and other information associated with a conversation in order that a command, action, or function (CAF) may be carried out using only partial information included in a typical text message received by the service. Multiple text messages may need to be received from a user, therefore, in order to fully define states associated with a user and/or a conversation.

Some of the problems associated with interactions include: 1) using a single conversation gateway or phone number to receive text messages from multiple users; 2) a user may try to carry out one or more CAFs at the same time; 3) a text message sent to a conversation gateway or phone number may not have any identifier that associates the message sent to a specific CAF; 4) a user could try to initiate another CAF while the service is still collecting information and/or parameters for a previously-initiated CAF (for example, the service may expect a name from a user in order to facilitate execution of a signup command, and the user may respond, instead, with a chat request).

Figure 12:
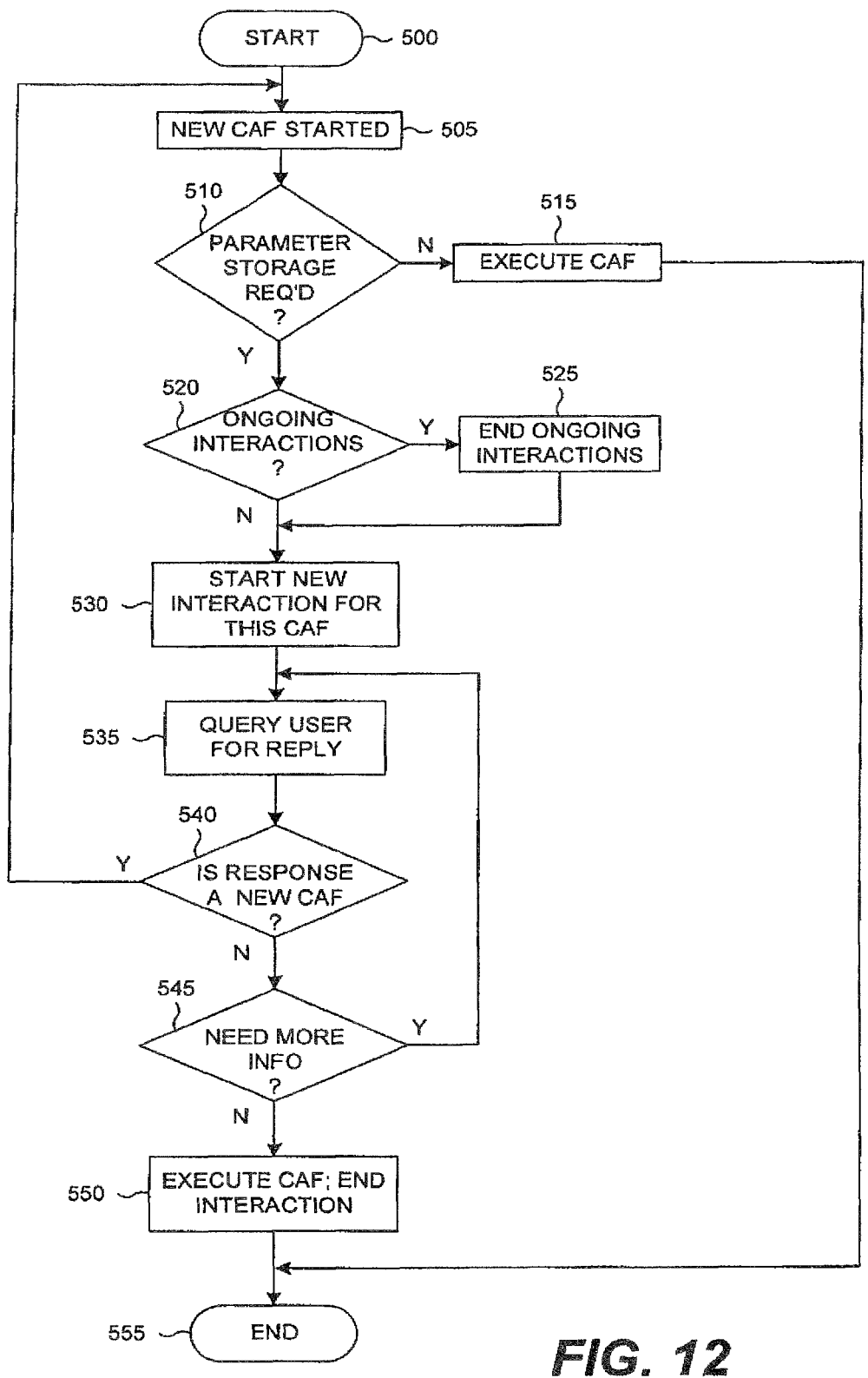
FIG. 12 is a flowchart describing one implementation of a method for managing interactions on a communication network.

One possible implementation of a method for addressing these and other problems that may be associated with interactions is summarized in a flowchart shown in FIG. 12. The illustrated implementation begins at step 500 and continues at step 505 where a new command, action, or function (CAF) may be initiated by a user or by the service. For example, a user may initiate a signup command. At step 510 the CAF is analyzed to determine whether the CAF requires an interaction in order to enable storing parameters necessary to execute the CAF. If no such interaction is required the CAF is executed at step 515 without starting a new interaction or affecting any other interaction already in progress. In that case, the illustrated implementation ends at step 555.

If, at step 510, an interaction is required to store parameters, then a test is performed at step 520 to determine whether any other interactions are ongoing. If there are other ongoing interactions, then those ongoing interactions stored in the service for the user/conversation gateway combination associated with the new CAF started at step 505 are ended. Execution then resumes at step 530. If there are no other ongoing interactions, then execution also resumes at step 530 where a new interaction is started for the CAF started at step 505. At step 535 the user is asked to reply with a parameter that may be required in order to complete the CAF. The service waits for a response to this query. At step 540 the response from the user is analyzed to determine whether the response constitutes a new CAF. If so, execution resumes at step 505, effectively abandoning any previously-started CAF and starting over. If at step 540, the response is not a new CAF, then the response is analyzed at step 545 to determine whether the response is invalid or, for example, whether additional parameters are required from the user. If the response is invalid or if more information is required, then execution resumes at step 535 by querying the user for a reply appropriate to the need for additional parameters or information. Otherwise, if more information is not required after the response, then at step 550 the CAF is executed, and the interaction is ended or removed. Execution then ends at step 555.

Figure 7:
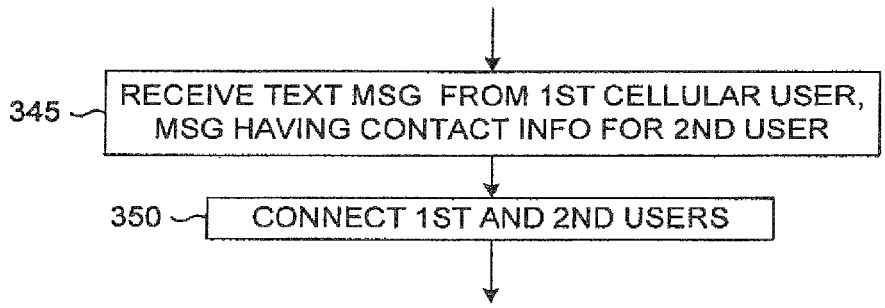
FIG. 7 is a flowchart illustrating an implementation of a method of establishing a connection between a first cellular telephone user and a second user.

In view of the foregoing, it will be understood by those skilled in the art that the methods of the present invention can facilitate establishment and operation of text-initiated text-based conversations over cellular telephone networks. These methods may permit providing users with text messaging service having many of the same characteristics as that of email. For example, everyone who receives a text message knows who else has received the message. Further, a "reply all" service may be provided, whereby a user is able to send a message to all users involved in a text-based conversation with one relatively simple operation. The above-described embodiments have been provided by way of example, and the present invention is not limited to these examples. Multiple variations and modification to the disclosed embodiments will occur, to the extent not mutually exclusive, to those skilled in the art upon consideration of the foregoing description. For example, FIG. 7 is a flowchart illustrating an implementation of a method of automatically establishing a connection, which may be a voice connection, between a first cellular telephone user and a second user in response to the text message. A text message is received (e.g., via Short Message Service (SMS), Multimedia Message Service (MMS) or the like) at step 345. According to a particular embodiment, the text message is received from a first cellular telephone user, the text message including contact information for the second user. Typically, the contact information comprises a telephone number for the second user. The first and second users are connected at step 350. It should be noted that the first user does not initiate a phone call from his/her cellular telephone. Rather the first user receives a call, e.g., from a service, that connects the first user to the second user.

Figure 8:
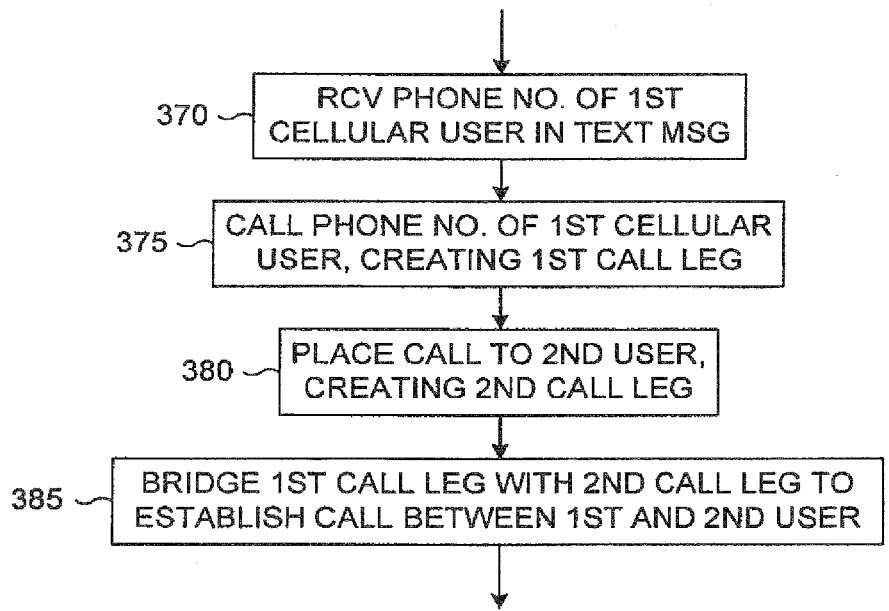
FIGS. 8-10 are flowcharts depicting three implementations of a method introduced in FIG. 7 for connecting first and second users.

The connecting of first and second users may be implemented, according to one particular example, as summarized in a flowchart in FIG. 8. According to this implementation, receiving the text message at step 345 (FIG. 7) comprises receiving a phone number of the first cellular telephone user at step 370 (FIG. 8). Alternatively, the phone number of the first cellular telephone user may be supplied by caller ID. A first call then may be placed to the phone number of the first cellular telephone user at step 375, thereby creating a first call leg. A second call may be placed to the second user at step 380, thereby creating a second call leg, and the first and second call legs may be bridged at step 385, thereby establishing a call between the first and second users. Again, the first user does not initiate a phone call.

Figure 9:
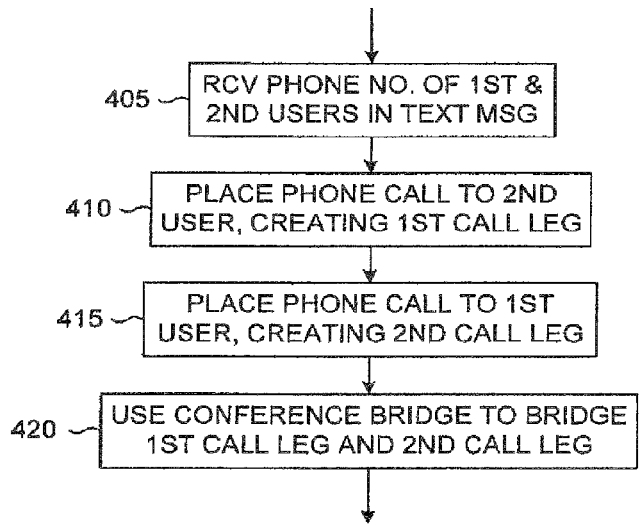

According to another implementation, illustrated in a flowchart in FIG. 9, phone numbers of the first cellular telephone user and of the second user are received at step 405. A phone call is then placed to the second user at step 410, thereby creating a first call leg. Another phone call is placed to the first cellular telephone user at step 415, thereby creating a second call leg. A conference bridge may then be used at step 420 to bridge the first and second call legs.

Figure 10:
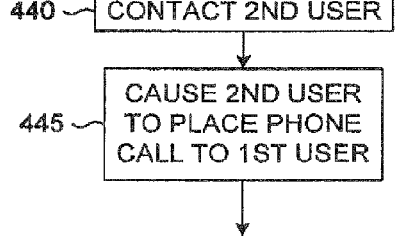

Yet another implementation of a method of connecting two users is illustrated in a flowchart in FIG. 10. According to this implementation, the second user is contacted at step 440, and the first cellular telephone user's phone number is submitted to the second user at step 445 and the second user calls the first user directly.

In none of the implementations summarized in FIGS. 8-10 does the first cellular telephone user initiate a phone call. The first cellular telephone user thereby may avoid any additional expense, e.g., long distance charges, associated with placing a call from his/her cellular telephone. Often, the second user pays for the phone call because the second user may be a business that may benefit from connecting with the first cellular telephone user. The implementations described require no computer network (e.g., internet) access on the part of the first cellular telephone user. In particular, the first cellular telephone user need not have a Wireless Application Protocol (WAP) or Web access enabled on his/her cellular telephone. The only requirement is that the first cellular telephone of the first user have a text messaging capability.

Figure 11:
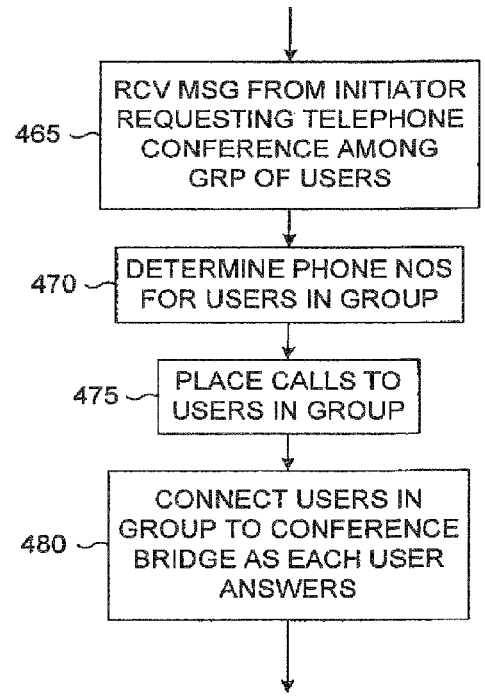
FIG. 11 is a flowchart describing an exemplary implementation of a method of enabling multiple telephone users to participate in a voice conference initiated by a text message.

As another example, FIG. 11 illustrates an exemplary implementation of a method of enabling multiple mobile or landline telephone users to participate in a voice conference initiated by a text message (via, e.g., SMS, MMS or the like). According to the illustrated implementation, a message is received from an initiator at step 465 requesting a telephone conference among a group of users. Phone numbers for users in the group are determined at step 470, and calls are placed to users in the group at step 475. The determining of phone numbers in the group may comprise receiving the phone numbers in the text message sent by the initiator, or the phone numbers may have been received and stored previous to the receiving of the call requesting the conference. As each user answers, he/she may be connected to a voice conference bridge at step 480. In some instances, users may also call in to the conference bridge to join a conference call already in progress.

The implementation of FIG. 11 enjoys several advantages when compared with traditional voice conference calls where participants call in to a pre-set conference call bridge number and session. No pre-set time is established when users must dial in. Initiators can specify conference call users and start a conference call spontaneously if desired. Users need not remember how or when to dial in, as they are called when a conference call commences. Rather than using SMS or MMS, a user can also initiate a telephone conference by clicking on a Uniform Resource Identifier (URI) or Uniform Resource Locator (URL) on a web-enabled mobile phone or on a personal computer (e.g., a laptop or desktop device) that is connected to an internet. Users participating in the conference may not be charged for long distance calls to the conference, because a service, rather, places calls to the users. Therefore, each user receives an incoming phone call that connects the user to the conference bridge.

Additional implementations will occur to one skilled in the art based on the example illustrated in FIG. 11. For example, a user may request a conference call, the request including contact information for a group of users to be involved in the conference call. Call-in details including, e.g., a call-in number may be sent to each user in the group via, for example, a Short Message Service (SMS) message. Users receiving the call-in details then may click on the call-in number to join the conference.

As yet another example, the implementations described supra with reference to FIGS. 1, 3, and 6 may be used to set up an ad hoc chat group. Whereas prior art services may require setting up a chat group using a pre-defined group of members, ad hoc chat initiations, according to the disclosure herein, may allow users to specify individuals with whom they want to chat at a time of initiation of the chat. Alternatively, a user may, if desired, set up a pre-defined group of friends in order to speed up initiation of a chat.

In order to initiate an ad hoc chat, a user may simply send a text message to a service (provided, for example, by the system 130 (FIG. 3) or computer 250 (FIG. 6) described supra with reference to FIGS. 3 and 6), the text message including, for example, a first name, partial first name, last name, partial last name, nickname, an identifier number of a user or some combination of users' names with which to start a chat. Alternatively, users may specify phone numbers of users with whom to chat if those users have not registered with the service. This capability of ad hoc chat may be useful for several reasons: 1) There is no need to set up chat groups prior to initiating a chat—a user can start a chat with any group of people; 2) ad hoc chats may be more useful in daily life than pre-set chat groups, because the former enables unlimited permutations of chat group members and hence can support spontaneous use of chats on-the-go; 3) the only required medium of communication on a cellular phone is text messaging; 5) no applications need to be downloaded to the cellular phone; and 6) the chat initiation request can be performed solely using text commands/requests and responses. No graphical user interfaces are required on either a cellular phone of a chat initiator or on cellular phones of other users invited to join a chat.

Figure 13:
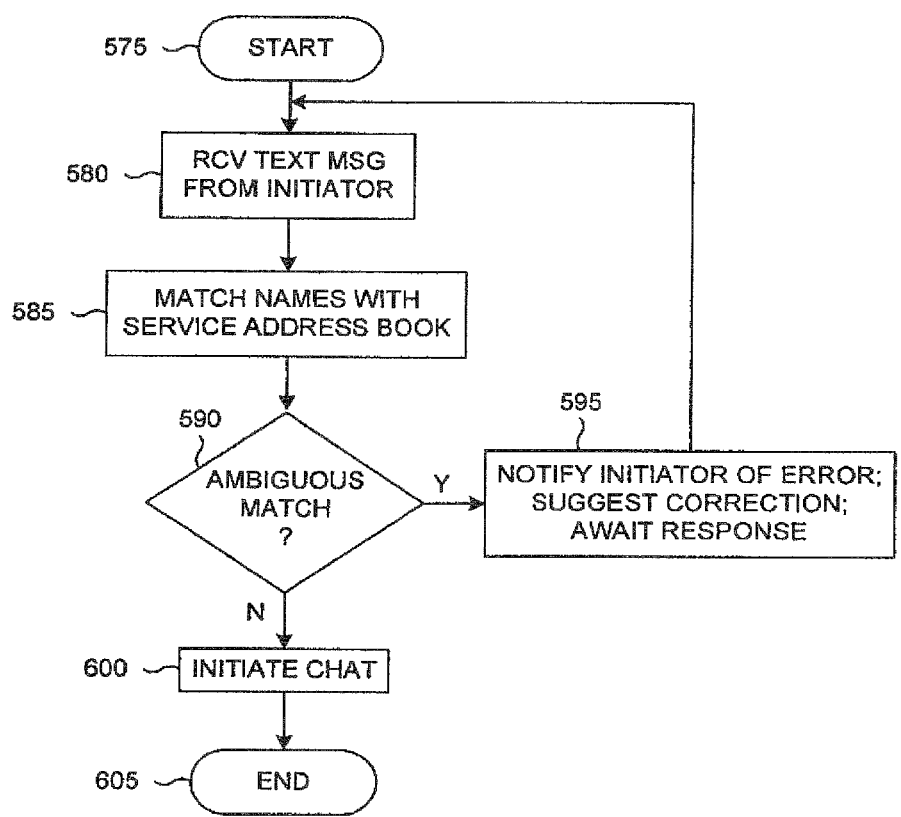
FIG. 13 is a flowchart illustrating one possible implementation of a method of initiating a chat.

FIG. 13 is a flowchart illustrating one possible implementation of a method of initiating a chat. The illustrated implementation commences at step 575 and receives a text message from a chat initiator at step 580. The text message may include a first name, partial first name, last name, partial last name, nickname, an identifier number of a user to be added to a chat. The text message also may include some combinations of users' names to be included in the chat being initiated. Alternatively, the initiator can also specify phone numbers of users to be invited to the chat if those users are not yet registers in an address book maintained by the service. The initiator also may have a group (i.e., a collection of users) pre-defined in one or more address books maintained by the service. The group may have a group name, and the group name may be specified as one of the chat participants. Where names are specified, users typically would have set up their own address books with the service specifying phone numbers and names/nicknames of contacts and friends. Such an address book setup may be done online or via a text message sent to the service.

When the text message is received at step 580, names specified by the initiator may be matched with names in service address books at step 585. The matching may comprise matching partial names, concatenating first and last names, concatenating a combination of first and last initials with first and last names, matching nicknames or partial nicknames, or matching with a speed-dial number (an identifier number corresponding to a user). If, at step 590 an ambiguous match is found, that is, a match that cannot be resolved by the service, then the initiator may be notified at step 595 that an error has occurred and that more information is required to resolve the error. The service also may suggest corrections and then wait for a response. When a response is received, execution may resume at step 580.

If, at step 590, no ambiguous match is noted, then the chat may be initiated at step 600 using, for example, a method similar to the implementation described supra with reference to FIG. 1, and the ad hoc chat initiation ends at step 605.

Figure 14:
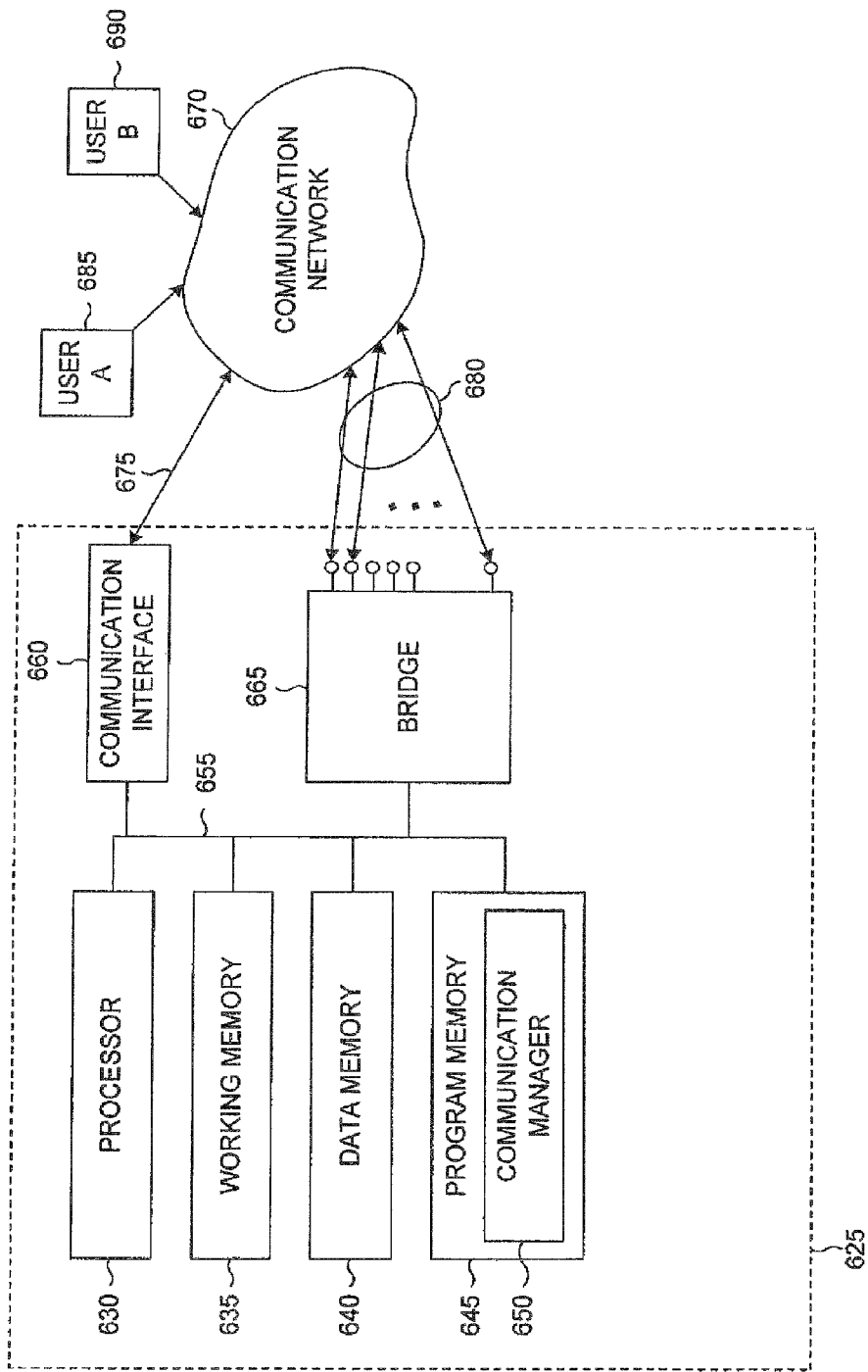
FIG. 14 is a block diagram of a computer adapted to implement methods illustrated in flowcharts of FIGS. 7-13.

Steps in the flowcharts illustrated in FIGS. 7-13 may be performed, according to an exemplary embodiment, by a computer adapted to implement methods illustrated in those flowcharts. For example, one possible implementation of such a computer is illustrated in FIG. 14. The illustrated embodiment of a computer 625 comprises a processor 630 adapted to execute software programs and memory, which may comprise, for example, working memory 635, data memory 640, which may be adapted to store data related to conversations, and program memory 645, which may be adapted to store software programs. The illustrated embodiment further comprises a communication interface 660 adapted to communicate over a communication path 675 with a communication network 670, which may be a cellular telephone network. The embodiment still further may comprise a bridge 665. A system bus 655 may provide an intercommunication path that permits the processor 630 to communicate with working memory 635, data memory 640, program memory X45, communication interface 660, and the bridge 665. One implementation of the bridge 665 may comprise a special type of telephone adapted to control multiple telephone calls. The program memory 645 may have stored therein software programs adapted to cause the processor 630 to perform operations according to the software programs. For example, the program memory 645 may have stored therein a communication manager 650 software program as well as additional software programs (not shown).

According to one possible exemplary mode of operation, the computer 625 of FIG. 14 may implement a method summarized in the flowchart of FIG. 8. For example, the processor 630, which may be executing the communication manager 650 software program, may receive, over the system bus 655, a text message, which may be an SMS message, through the communication interface 660 from a user, e.g., User A 685, User A 685 having a connection to the communication network. 670. The received text message may include a request to establish a telephone call with another user on the communication network 670, for example, User B 690. The communication manager 650 software program then may cause the processor 630 to cause the bridge 665 to place a call to User A 685 using one of a plurality of communication paths 680 that connect the bridge 665 to the communication network 670. The call to User A 685 may be considered to be a first leg of a phone call. The communication manager 650 software program then may cause the processor 630 to cause the bridge 665 to place another call to User B 690 using another of the plurality of communication paths 680. The call to User B 690 may be considered to be a second leg of a phone call. The communication manager 650 software program then may cause the processor 630 to cause the bridge 665 to connect the first and second legs together, thereby establishing a telephone connection between User A 685 and User B 690. It should be noted that the method just described (cf. FIG. 8) requires neither User A 685 nor User B 690 to initiate a telephone call.

One skilled in the art will understand that the computer 625 illustrated in FIG. 14 may be adapted as well to perform functions according to methods described in FIGS. 7 and 9-13.

Other combinations, omissions, substitutions and modifications will be apparent to the skilled artisan in view of the disclosure herein. Accordingly, the present invention is not intended to be limited by the disclosed embodiments, but is to be defined by reference to the appended claims.

What is claimed is:

1. A computer-implemented method comprising:
   receiving a request to create a conversation over a communication network employing an Internet protocol;
   creating a conversation identifier according to the request;
   receiving a plurality of lists of conversation gateways currently unused by a plurality of computing devices;
   selecting a plurality of conversation gateways to be used by the plurality of computing devices for the conversation, the plurality of selected conversation gateways being selected according to the plurality of lists of currently unused conversation gateways; and
   associating the plurality of selected conversation gateways and the plurality of computing devices with the conversation identifier, the associating enabling at least a first computing device of the plurality of computing devices to communicate across conversation gateways with at least a second computing devices of the plurality of computing devices, wherein the first computing device uses a first conversation gateway and the second computing device uses a second conversation gateway that is different from the first conversation gateway to communicate across conversation gateways.

2. The computer-implemented method of claim 1, wherein the receiving the request comprises receiving a payload comprising an encoded version of a plurality of identifiers according to the plurality of computing devices.

3. The computer-implemented method of claim 2, wherein the plurality of identifiers comprises a plurality of names and numbers according to the plurality of computing devices.

4. The computer-implemented method of claim 3, wherein the plurality of names and numbers are received from an address book on a telephone of a requesting user.

5. The computer-implemented method of claim 1, wherein the receiving the request further comprises receiving an initial message from a requesting computing device.

6. The computer-implemented method of claim 1, wherein the conversation comprises a collection of messages, the method further comprising transmitting a first message of the conversation to the plurality of computing devices over the plurality of selected conversation gateways.

7. The computer-implemented method of claim 1, further comprising:
   receiving at least one message from a selected conversation gateway; and
   transmitting the at least one message to the plurality of computing devices over a remainder of the plurality of selected conversation gateways.

8. A computer-implemented method comprising:
   selecting a first conversation gateway, from a list of currently unused conversation gateways, to enable a first conversation over a communication network between a first computing device and a second computing device, the communication network employing an Internet protocol;
   selecting a second conversation gateway, from a list of currently unused conversation gateways, to enable a second conversation over the communication network between the second computing device and a third computing device; and
   enabling a third conversation between the first computing device and the third computing device over the conversation network across conversation gateways, the enabling comprising enabling the first computing device to utilize the first conversation gateway and enabling the third computing device to utilize the second conversation gateway.

9. The computer-implemented method of claim 8, wherein enabling the third conversation between the first computing device and the third computing device across conversation gateways makes available a third conversation gateway for a fourth conversation.

10. The computer-implemented method of claim 8, wherein the first and second conversation gateways comprise a virtual channel characterized by a unique identifier to which computing devices can send messages and from which computing devices may receive messages.

11. The computer-implemented method of claim 10, wherein the unique identifier comprises a shortcode or a telephone number.

12. The computer-implemented method of claim 8, wherein the first and second conversation gateways comprise a communication medium characterized by a unique identifier to which computing devices can send messages and from which computing devices may receive messages.

13. A system comprising:
   one or more processors; and
   one or more memories comprising instructions stored thereon that, responsive to execution by the one or more processors, implement a conversation gateway selector, the conversation gateway selector configured to:
   select a first conversation gateway, from a list of currently unused conversation gateways, to enable a first conversation over a communication network between a first computing device and a second computing device, the communication network employing an Internet protocol;
   select a second conversation gateway, from the list of currently unused conversation gateways, to enable a second conversation over the communication network between the second computing device and a third computing device; and
   enable a third conversation between the first computing device and the third computing device over the conversation network across conversation gateways by enabling the first computing device to utilize the first conversation gateway and enabling the third computing device to utilize the second conversation gateway.

14. The system of claim 13, wherein enabling the third conversation between the first computing device and the third computing device across conversation gateways makes available a third conversation gateway for a fourth conversation.

15. The system of claim 13, wherein the first and second conversation gateways comprise a virtual channel characterized by a unique identifier to which computing devices can send messages and from which computing devices may receive messages.

16. The system of claim 13, wherein the first and second conversation gateways comprise a communication medium characterized by a unique identifier to which computing devices can send messages and from which computing devices may receive messages.

17. The system of claim 13, wherein the first conversation gateway is different from the second conversation gateway.

* * * * *